United States Patent [19]
Matsuoka

[11] Patent Number: 5,386,896
[45] Date of Patent: Feb. 7, 1995

[54] TORSIONAL VIBRATION DAMPING DEVICE AND LOCK-UP CLUTCH IN TORQUE CONVERTER

[75] Inventor: Yoshihiro Matsuoka, Neyagawa, Japan

[73] Assignee: Kabushiki Kaisha Daikin Seisakusho, Osaka, Japan

[21] Appl. No.: 85,615

[22] Filed: Jun. 30, 1993

[30] Foreign Application Priority Data

Jul. 6, 1992 [JP] Japan ............................. 4-046861[U]
Oct. 23, 1992 [JP] Japan ................................. 4-286479

[51] Int. Cl.⁶ ............................................. F16D 33/00
[52] U.S. Cl. ...................................... 192/3.29; 188/277;
192/3.33; 192/82 T; 192/106.2; 267/277;
464/24; 464/68
[58] Field of Search ................... 192/3.29, 3.28, 3.33,
192/82 T, 106.1, 106.2; 188/277, 293, 294;
267/277; 464/24, 67, 68

[56] References Cited

U.S. PATENT DOCUMENTS

| | | | |
|---|---|---|---|
| 2,699,846 | 1/1955 | Pitman et al. | 192/82 T |
| 3,837,181 | 9/1974 | Leuenberger | 464/24 |
| 4,295,550 | 10/1981 | Hayashi | 192/82 T X |
| 4,441,595 | 4/1984 | Lamarche | 192/3.29 |
| 4,643,283 | 2/1989 | Wonn | 192/3.33 |
| 4,728,314 | 3/1989 | Eckel et al. | 464/24 X |
| 4,828,533 | 5/1989 | Focqueur et al. | 464/24 |
| 4,987,981 | 1/1991 | Casse et al. | 192/3.29 |
| 5,097,722 | 3/1992 | Fukushima | 192/106.1 X |
| 5,103,688 | 4/1992 | Kühne | 192/106.1 X |
| 5,125,486 | 6/1992 | Murata | 192/3.26 |
| 5,180,044 | 1/1993 | Fukushima et al. | 192/106.1 |
| 5,240,457 | 8/1993 | Leichliter et al. | 192/3.29 X |

FOREIGN PATENT DOCUMENTS

61-123258 8/1986 Japan .

*Primary Examiner*—Andrea L. Pitts
*Attorney, Agent, or Firm*—Knobbe, Martens, Olson & Bear

[57] ABSTRACT

A torsional vibration damping device located between an input member and an output member of a power transmission device comprises a case and a slider. The case is connected to either the input or output member, extends circumferentially and contains fluid. The slider is connected to the other input or output member and is located within the case at a given clearance from an inner wall thereof wherein It is slidable circumferentially. The coefficient of thermal expansion of the slider is greater than that of the case.

40 Claims, 12 Drawing Sheets

TORSIONAL VIBRATION DAMPING DEVICE AND LOCK-UP CLUTCH IN TORQUE CONVERTER

BACKGROUND OF THE INVENTION

The present invention relates to a torsional vibration damping device and a lock-up clutch in a torque converter comprising three kinds of vane wheels (impeller, turbine and stator) wherein torque is transmitted by means of hydraulic fluid. The impeller is fixed to a-front cover connected to an input rotation member, and the turbine is rotated by the hydraulic fluid flowing from the impeller.

Some torque converters include a lock-up clutch between the turbine and the front cover. The lock-up clutch transmits torque from the front cover to an output member directly. The lock-up clutch includes elastic members such as torsion springs in order to absorb torsional vibrations. It is preferable that the torsional springs have low rigidity so as to prevent noise at the idling or driving of a vehicle. Low-rigidity torsion springs are, however, a cause of large vibration of the vehicle in the front-to-rear direction when low frequency vibration is generated by acceleration or deceleration during the lock-up engagement.

In order to solve the above mentioned problem, Japanese Utility Model Laying-Open document No. 123258/1986 shows a viscous damping mechanism and an elastic connection device which function in parallel. The-torsional vibration damping device mainly comprises a first cylinder provided on the input rotation member, and a second cylinder connected to an output member, wherein an annular fluid chamber is formed between them. The first cylinder and second cylinder are provided with partition plates alternately extending toward each other, wherein a clearance is defined between the ends of the partition plates and the cylinder end surface opposite. When both cylinders are made to twist relative to each other by torsional vibration, the fluid flows through the clearance giving rise to viscous damping.

In the above described structure, accuracy of the clearances is low. That is, when both cylinders are fixed to the input member and the output member respectively, the clearances become different because of working errors and assembly errors. Moreover, when the temperature of the fluid rises due to viscous friction, the fluid viscosity becomes low such that the viscous damping decreases and desired damping effects cannot be obtained.

SUMMARY OF THE INVENTION

It is an object of the present invention to maintain desired viscous damping.

A torsional vibration damping device according to an aspect of the present invention is employed in a power transmission device comprising an input rotation member and an output rotation member connected to each other such that they can twist relative to each other. The torsional vibration damping device comprises a case extending circumferentially and a slider. The case is connected one of the input and output rotation members and contains viscous fluid therein. The slider is connected to the other of the input and output rotation members, and is located within the case so as to be movable circumferentially with a Clearance between itself and the inner surface of the case. The coefficient of thermal expansion of the slider is larger than that of the case.

In this device, when torque fluctuation is transmitted from the input rotation member, the case and the slider twist relative to each other. Therein, the viscous fluid flow through the clearance between the inner surface of the case and slider is such that the viscous resistance arising in the clearance damps the torsional vibration.

When the temperature of the viscous fluid rises, the slider expands more than the case so that the clearance between and the case inner surface becomes narrower. Consequently, even wherein the viscosity of the viscous fluid decreases due to temperature rise, the desired viscous damping can be maintained.

A lock-up clutch according to another aspect of the present invention is employed in a torque converter comprising a front cover connected to an input rotation member and a turbine connected to an output rotation member. The lock-up clutch comprises a disc-shaped piston, a torsional vibration damping device and an elastic connection mechanism. The piston is located between the turbine and the front cover such that the piston can move axially and press against the front cover. The torsional vibration damping device comprises a case extending circumferentially and containing viscous fluid therein, and a slider located within the case so as to be movable circumferentially, forming a clearance between itself and the inner surface of the case. The case and the piston can be connected to either the input rotation member or the output rotation member. The elastic connection mechanism connects the piston and the output rotation member in parallel with the torsional vibration damping device.

Wherein the piston moves axially and presses against the front cover, the torque is transmitted from the front cover to the output rotation member through the piston and the elastic connection mechanism.

In an instance in which torsional vibration is transmitted from the input rotation member, the torsional vibration damping device and the elastic connection mechanism function in parallel so as to effectively damp the torsional vibration. In this lock-up clutch, the case and the slider twist relative to each other such that viscous fluid passes through the clearance between the slider and the inner surface of the case, giving rise to viscous damping.

The slider can be so formed as to define a clearance by adjusting its dimension to that of the case. Accordingly, accuracy of the clearance is high and desired viscous damping can be maintained.

The foregoing and other objects, aspects and advantages of the present invention will become more apparent from the following detailed description.

DESCRIPTION OF THE PREFERRED EMBODIMENT

First Embodiment

Figure 1:
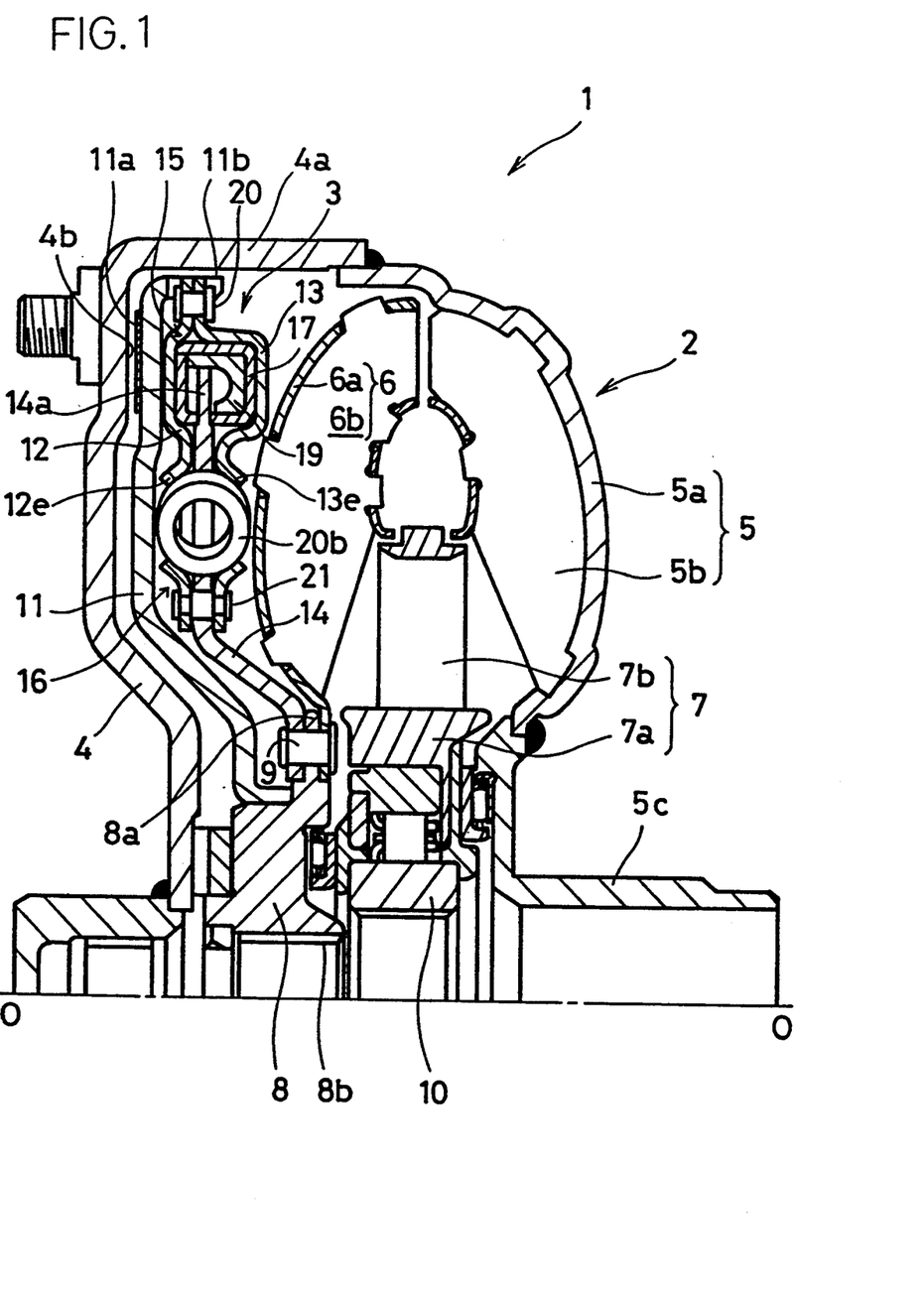
FIG. 1 is a partial sectional view of a torque converter to which an embodiment of the present Invention is applied.

FIG. 1 shows a torque converter 1 to which an embodiment of the present invention is applied, wherein O—O is a rotational axis of the torque converter 1.

The torque converter 1 comprises a torus 2 and a lock-up clutch 3. A front cover 4 connectable to an engine side member (not shown) is provided with a cylindrical portion 4a at the outer periphery which is welded to an impeller shell 5a of an impeller 5. The front cover 4 and the impeller shell 5a form a hydraulic fluid chamber containing hydraulic fluid.

The torus 2 is mainly composed of the impeller 5, a turbine 6 and a stator 7.

The impeller shell 5a of the impeller 5 has an inner periphery fixed to an impeller hub 5c. A plurality of impeller blades 5b are fixed to the inner side of the impeller shell 5a. Located opposite the impeller 5 is the turbine 6 which is composed of a turbine shell 6a and a plurality of turbine blades 6b fixed to the turbine shell 6a. The inner periphery of the turbine shell 6a is fixed to a flange 8a of a turbine hub 8 by rivets 9. The turbine hub 8 is provided with inner splines 8b engaging with a main drive (not shown) of the transmission.

The stator 7 is located between inner peripheries of the impeller 5 and turbine 6. The stator 7 coordinates direction the hydraulic fluid returning from the turbine 6 to impeller 5, and is composed of an annular stator carrier 7a, and a plurality of stator blades 7b formed on the outer surface of the stator carrier 7a. The stator carrier 7a is connected to an inner race 10 through an one-way clutch mechanism. The inner race 10 is connected to a fixed shaft (not shown) extending from the housing side (from right side in the figure).

The lock-up clutch 3 is disposed between the front cover 4 and the turbine 6. The lock-up clutch 3 comprises a disc-shaped piston 11, a viscous damping mechanism 15 and an elastic connection mechanism 16 functioning in parallel. Radially inward end of the piston 11 is supported on the outer surface of the turbine hub 8 so as to be movable axially and circumferentially. An annular friction member 11a is attached to a piston 11 surface opposing a friction surface 4b of the front cover 4. The piston 11 is provided with a cylindrical end wall 11b on the outer periphery which extends in the axially rearward (rightward in FIG. 1). The end wall 11b is formed with a plurality of cutouts extending circumferentially.

Figure 2:
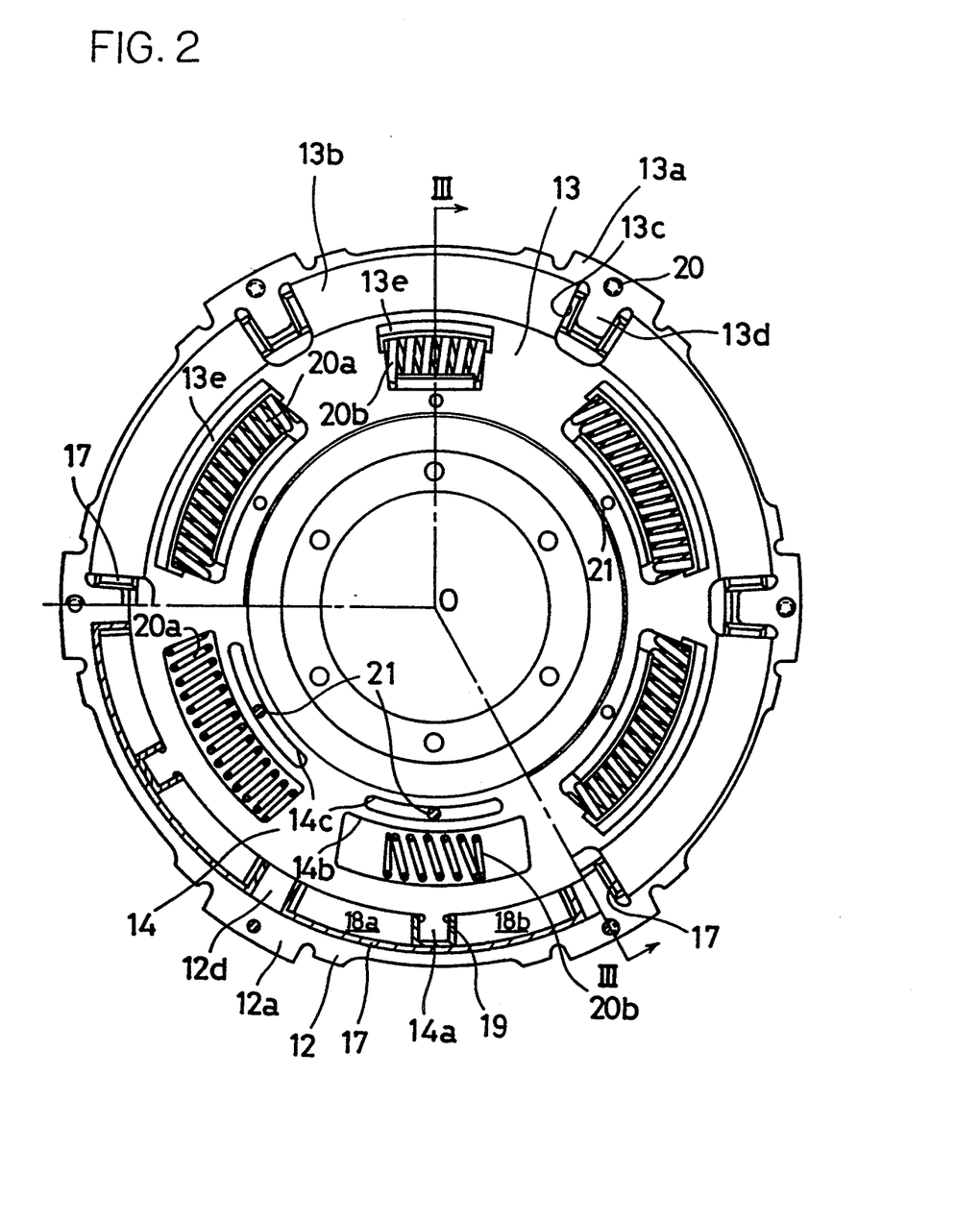
FIG. 2 is a front view of a lock-up clutch therein.
Figure 3:
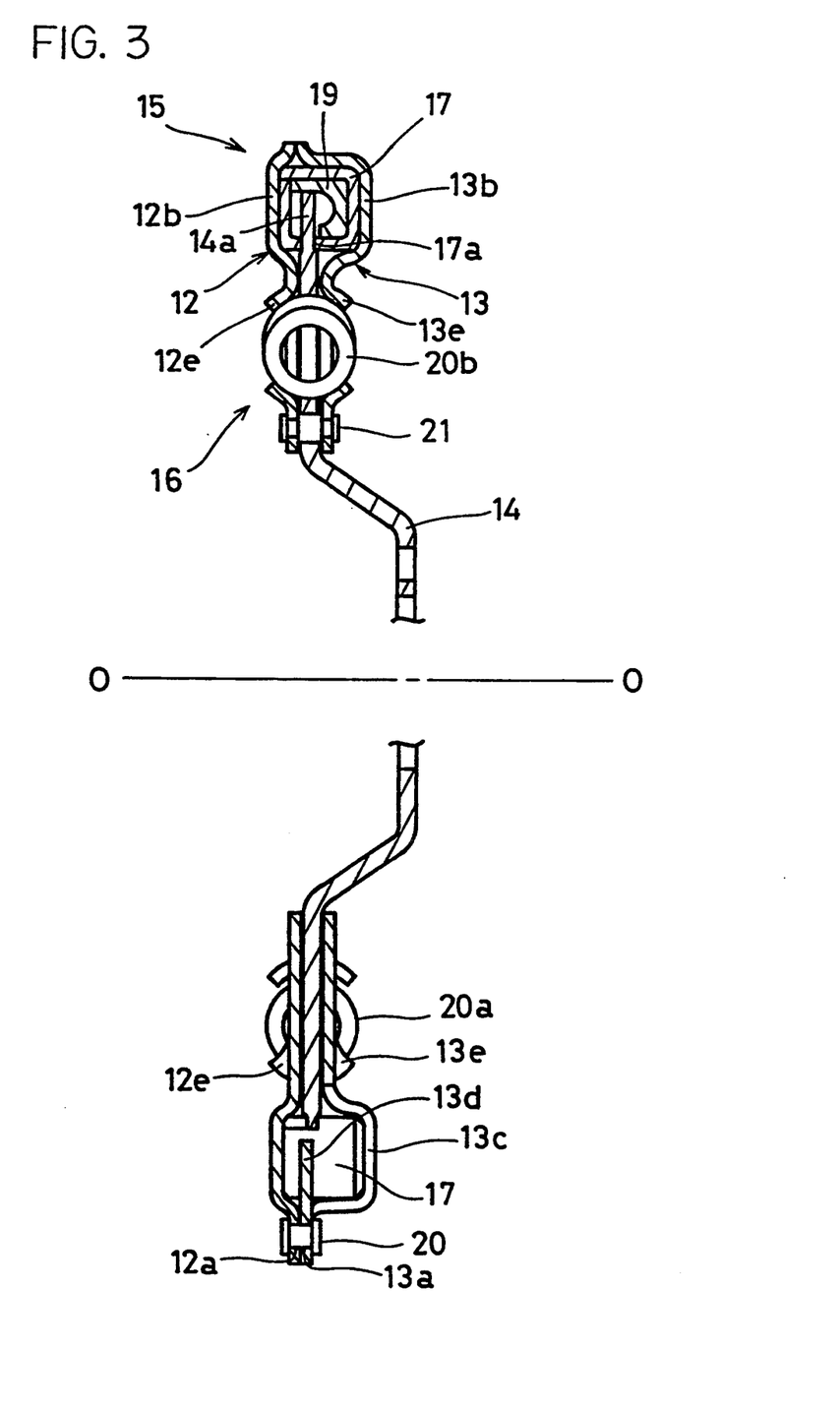
FIG. 3 is a section taken through line III—III of FIG. 2.

The viscous damping mechanism 15 and the elastic connection mechanism 16 are composed of disc-shaped first and second drive plates 12 and 13, and a driven plate 14. As shown in FIG. 2 and FIG. 3, the first drive plate 12 and the second drive plate 13 have respective extensions 12a and 13a which extend radially outward and keep in contact with each other. The extensions 12a and 13a are connected by rivets 20. The extensions 12a and 13a are engaged with cutouts formed in the end wall 11b of the piston 11 (FIG. 1) such that the piston 11 can move axially and press against the front cover 4 while it is prohibited from rotating relative to both drive plate 12 and 13.

The first drive plate 12 and the second drive plate 13 have container portions 12b and 13b respectively, which extend in the circumferential direction and projecting axially outward. The container portion 13b is divided circumferentially by cutouts 13c formed in the second drive plate 13, and the drive plate has a tab 13d projecting radially inward and into the cutout 13c from the extensions 13a.

Fixed in spaces formed by the container portion 12b and 13b are metal arcwise cases 17, ends of which being in contact with the tabs 13d. The arcwise case 17 contains the hydraulic fluid commonly used in the torus 2. A resin box-type slider 19 is located in each of the arcwise cases 17. Radially outer and inner wall of slider 19 is as arcwise as radially outward and inner walls of the arcwise case 17 such that the slider 19 can move circumferentially in the arcwise case 17. The slider 19 divides inside of the arcwise case 17 into a chamber 18a and a camber 18b. Radially inner wall of the arcwise case 17 is formed with a slit 17a extending circumferentially, into which radially outward portion of the driven plate 14 is inserted. The outer periphery of the driven plate 14 is provided with a plurality of extending portions 14a which are engaged with the slider 19 so as to rotate integrally.

A small clearance is kept between the slider 19 and inner wall of the arcwise case 17. In this embodiment, coefficient of thermal expansion of the resin slider 19 is larger than that of the metal arcwise case 17. Accordingly, if temperature of the hydraulic fluid rises and the slider 19 expands, the clearance between the slider 19 and the arcwise case 17 becomes smaller. Although the viscosity of the hydraulic fluid becomes lower when the temperature rises, the rate of the viscosity decrease anti the rate of the clearance narrowing are proportional so that the same viscous damping can be obtained.

Furthermore, the clearance can be determined by adjusting the size of the slider 19 relative to the arcwise case 17 so that the accuracy of the clearance is very high. Accordingly the desired viscous damping can be maintained. That is, in this embodiment, the clearance can be ensured accurately only by managing working accuracy of the arcwise case 17 and the slider 19, whereby more precise characteristics reproductivity can be obtained with simpler working as compared to the prior art device. Still, the hydraulic fluid in the torus 2, which viscosity is relatively low, can be commonly used in the viscous damping mechanism 15 without losing enough high viscous damping.

Radially inward end of the driven plate 14 is fixed to the flange 8a of the turbine hub 8 by a plurality of rivets 9. Formed in the radially middle portion of the driven plate 14 are six windows 14b extending circumferentially, in which four long first torsion springs 20a and two short second torsion springs 20b are located. The second torsion springs 20b are located in the windows 14b keeping spaces circumferentially. The first drive plate 12 and the second drive plate 13 is provided with retaining portion 12e and 13e raised axially which correspond to the windows 14b. The first drive plate 12 and the second drive plate 13 are fixed to each other by a plurality of rivets 21, which are, as shown in FIG. 2, inserted into circumferentially extending holes 14c formed In the driven plate 14, whereby the drive plates 12 and 13 are movable circumferentially in a certain angle range.

Next, the operation of the before-mentioned embodiment will be explained.

When the engine (not shown) begins to rotate, the torque is input to the front cover 4. The impeller 5 rotates with the front cover 4 and the torque is transmitted to the turbine 6 through the hydraulic fluid. The torque of the turbine 6 is transmitted to the main drive shaft (not shown) of the transmission through the turbine hub 8.

After the main drive shaft (not shown) reaches a given rotation speed, oil hydraulics in the fluid chamber of the torus 2 is increased and oil hydraulics between the front cover 4 and the piston 11 is decreased, whereby the piston 11 is urged against the front cover 4. The friction member 11a of the piston 11 is urged against the friction face 4b of the front cover 4 and the torque of the front cover 4 is mechanically transmitted to the turbine hub 8 through the lock-up clutch 3.

During the lock-up engagement (during engine high speed rotation), torsional vibration is transmitted from the engine side to the torque convertor 1 by operations such as acceleration or deceleration. The viscous damping mechanism 15 and the elastic connection mechanisms 16 function in parallel between the drive plates and the driven plate 14 in order to damp torsional vibration.

During the lock-up clutch 3 engagement, the viscous damping mechanism 15 action increases temperature of the hydraulic fluid in the arcwise case 17. As the temperature increases, slider 19 expands larger than the arcwise case 17 so that the clearance between the slider 19 and the arcwise case 17 becomes smaller. Accordingly, even though the hydraulic fluid viscosity decreases by the temperature up, the desired viscous damping can be maintained.

Second Embodiment

In this embodiment, the torque convertor 1 is similar to that in the first embodiment except for a lock-up clutch 3 and an inertia ring 41. The similar structure will not be explained.

Figure 4:
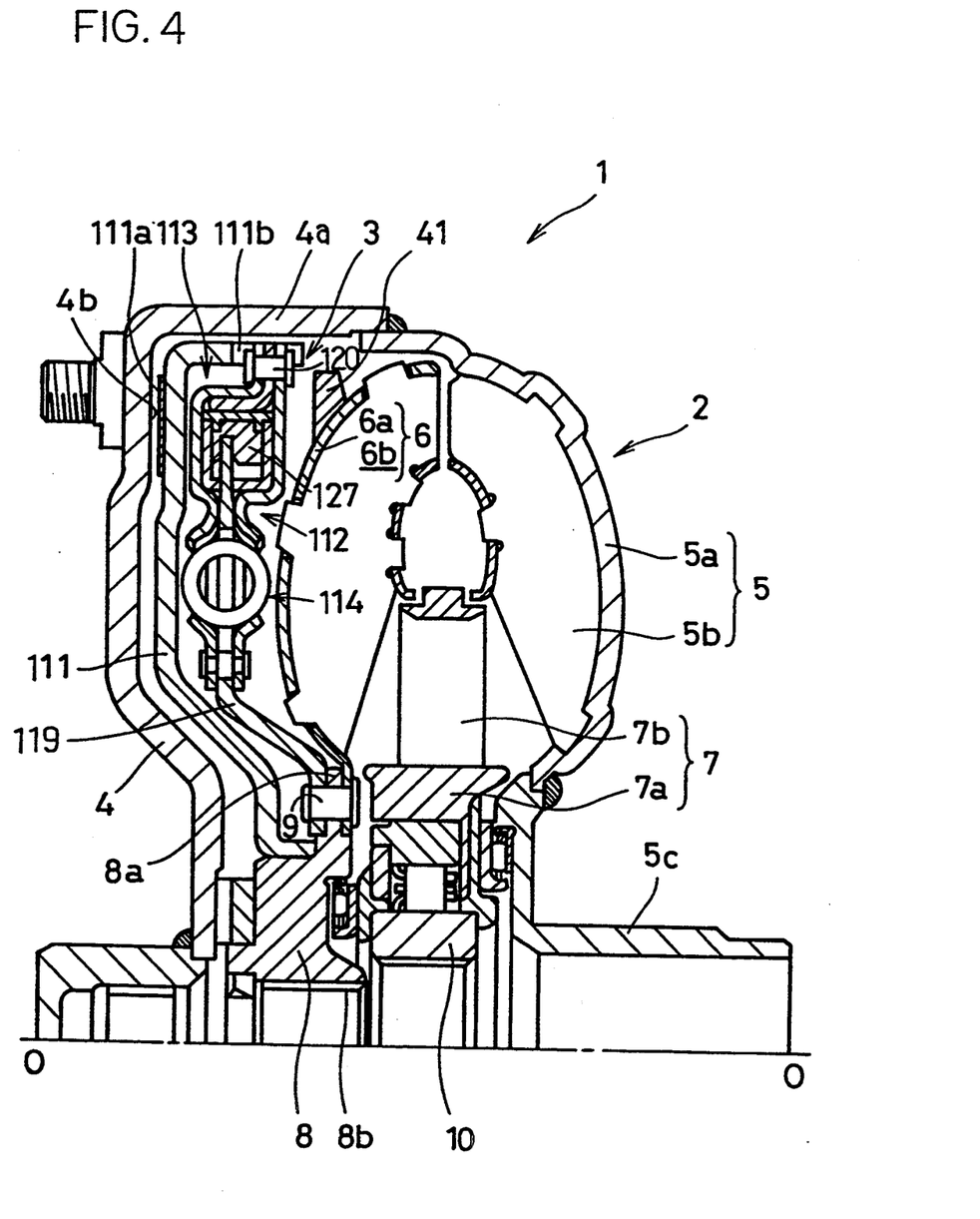
FIG. 4 is a partial sectional view of a torque converter to which another embodiment of the present invention is applied.

As shown in FIG. 4, an inertia ring 41 is welded to the outer periphery of the turbine shell 6a.

The lock-up clutch 3 is disposed between a front cover 4 and a turbine 6. The lock-up clutch 3 is mainly composed of a disk-shaped piston 111, a driven plate 119, an elastic connection mechanism 114 elastically connecting the piston 111 and the driven plate 119, and a torsional vibration damping mechanism 112 for damping torsional vibration between the piston 111 and the driven plate 119.

Radially inward end of the piston 111 is supported by the outer surface of the turbine hub 8 such that the piston 111 can slide axially and circumferentially. An annular friction member 111a is attached to an outer periphery surface of the piston 111 opposing a friction surface 4b of the front cover 4. The piston 111 is provided with a cylindrical end wall 111b extending axially outward (rightward in FIG. 4) from the outer peripheral end. The end wall 111b is provided with a plurality of cutouts extending circumferentially.

Figure 6:
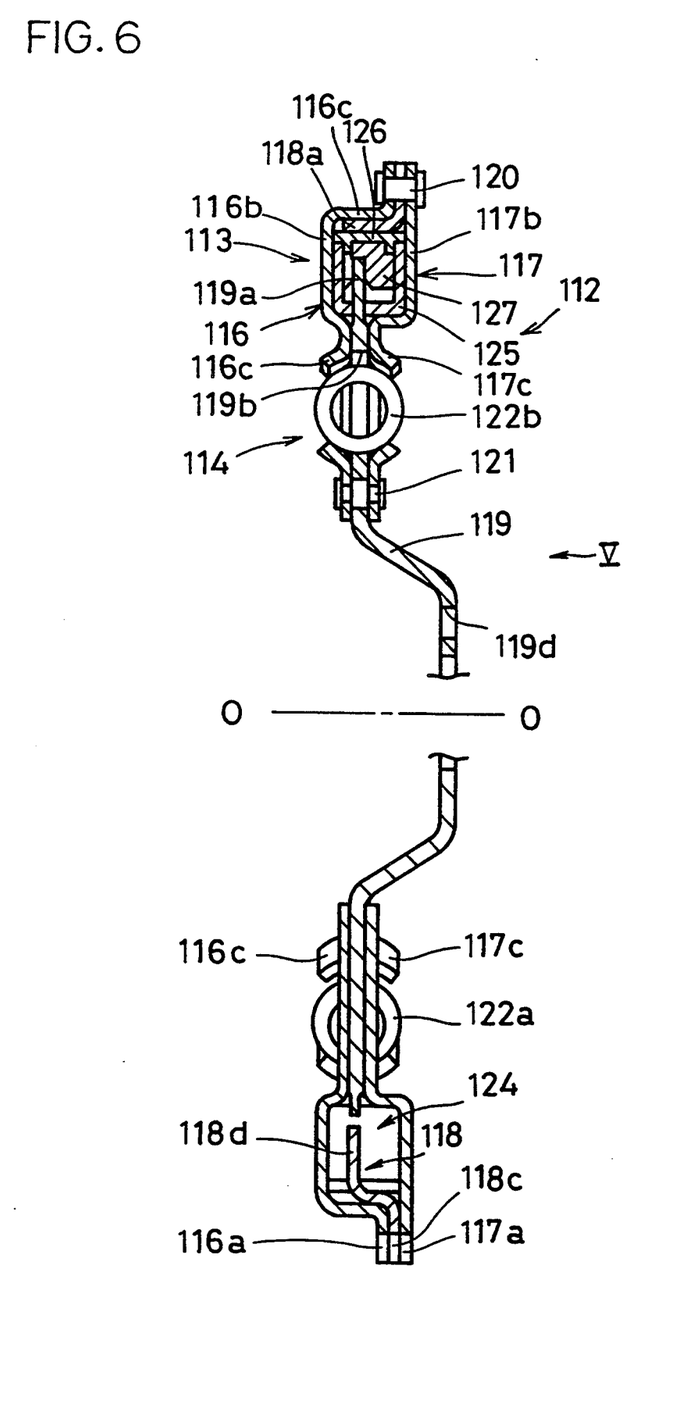
FIG. 6 is a section taken through line VI—VI of FIG. 5.

The torsional vibration damping mechanism 112 comprises, as shown in FIG. 6, a pair of first and second side plates 116 and 117, a sub-plate 118 and a viscous damper 113.

Figure 5:
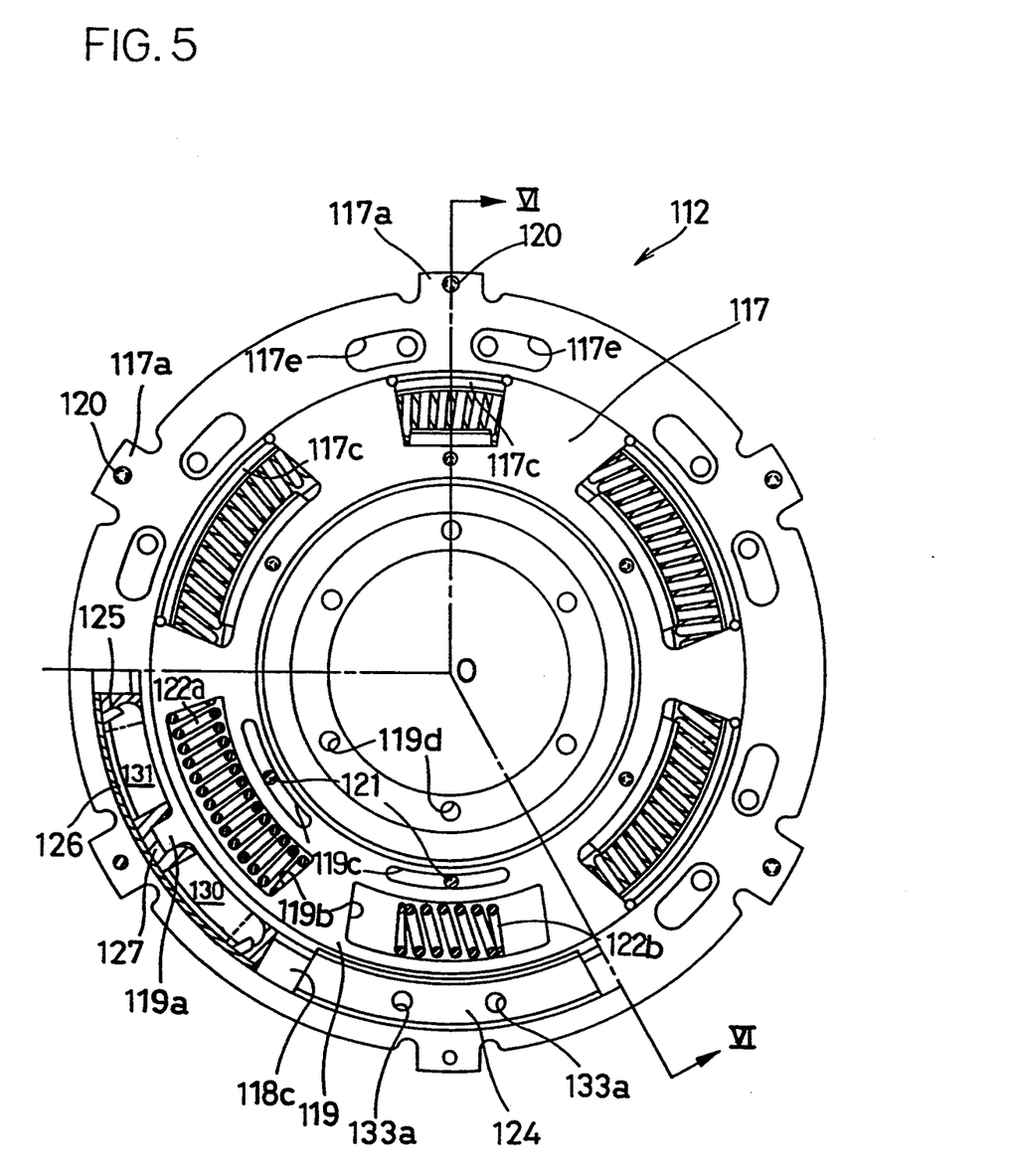
FIG. 5 is a front view of a lock-up clutch therein.

As shown in FIG. 5 and FIG. 6, the first side plate 116 and the second side plate 117 are formed like a disk, and are provided with a plurality of extensions 116a and 117a extending radially outward from the outer periphery. The outer periphery of the first side plate 116 is bent toward the second side plate 117 and corresponding extensions 116a and 117a are connected by rivets 120. The extensions 116a and 117a are engaged with the cutouts formed in the end wall 111b of the piston 111 such that the piston 111 can move axially and press against the front cover while it is engaged with the side plates 116 and 117 circumferentially.

The first side plate 116 and the second side plate 117 are provided with container portions 116b and 117b, respectively, which portions extend circumferentially and projecting axially outward. The container portion 116b is formed with a cylindrical wall 116c on the outer periphery.

Figure 7:
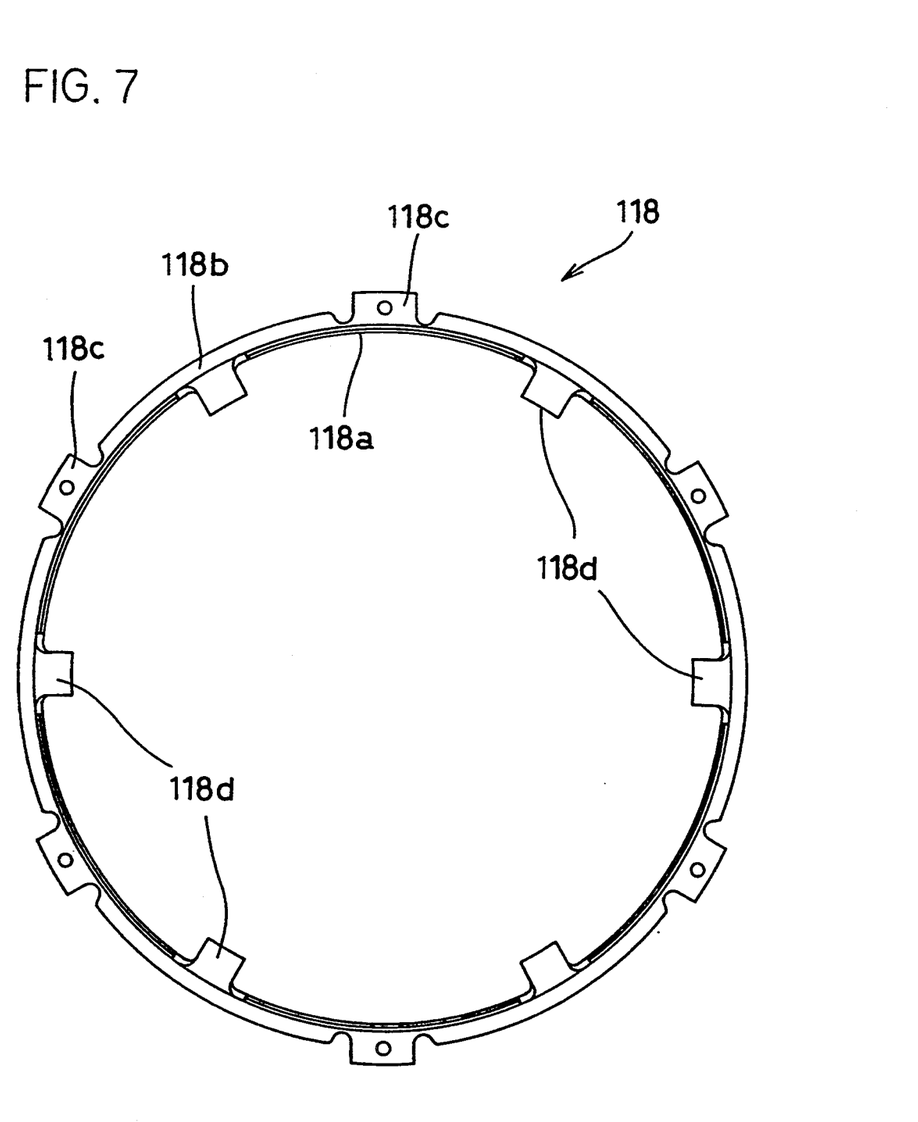
FIG. 7 is a front view of a damper sub plate.

The sub-plate 118 is, as shown in FIG. 7, a ring-shaped member and is provided with a cylindrical body 118a which is located inside of the cylindrical wall 116c of the container portion 116b. The cylindrical body 118a is formed with a flange 118b extending radially outward from one end. The flange 118b are provided with a plurality of extensions 118c corresponding to the extensions 116a and 117a of the first and second side plate 116 and 117. The extensions 118c are interposed between the corresponding extensions 116a and 117a and connected to the extensions 116a and 117a by rivets 120. Also, as shown in FIG. 7, the sub-plate 118 is provided with a plurality of tabs 118d extending radially inward.

Figure 8:
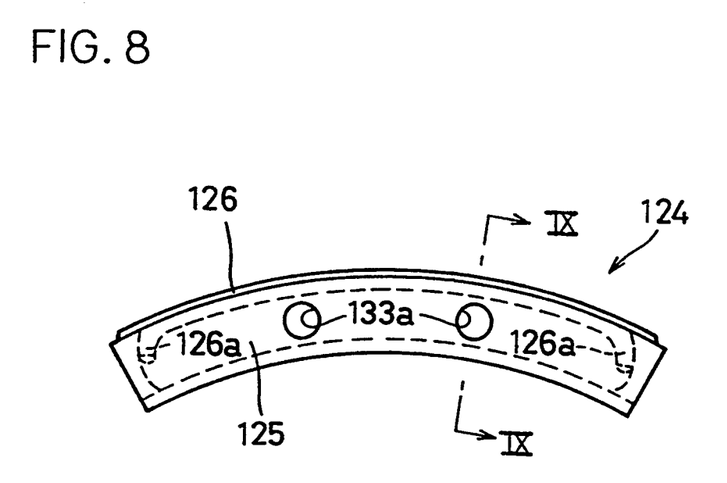
FIG. 8 is a rear elevational view of a damper case.
Figure 9:
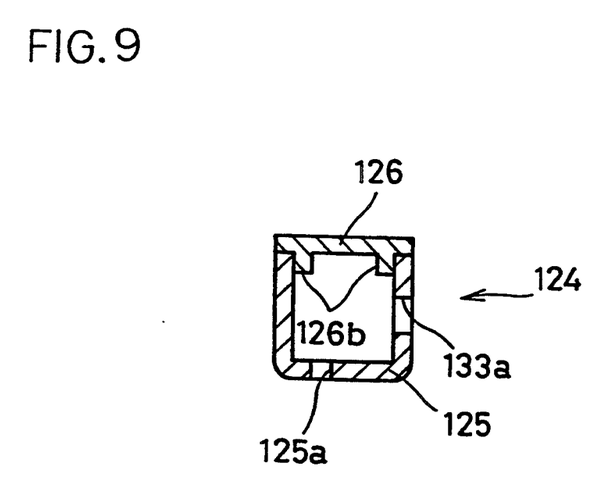
FIG. 9 is a section taken through line IX—IX of FIG. 8.
Figure 10:
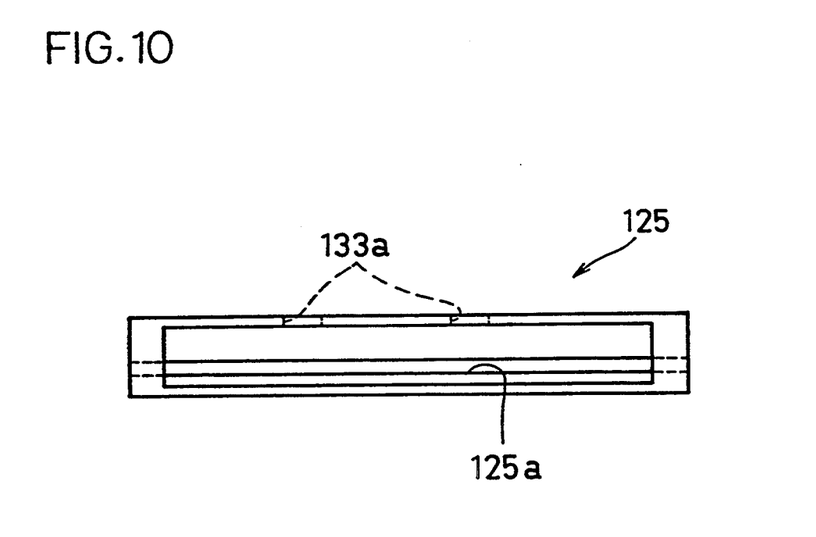
FIG. 10 is a top view of a casing part of the damper case.
Figure 11:
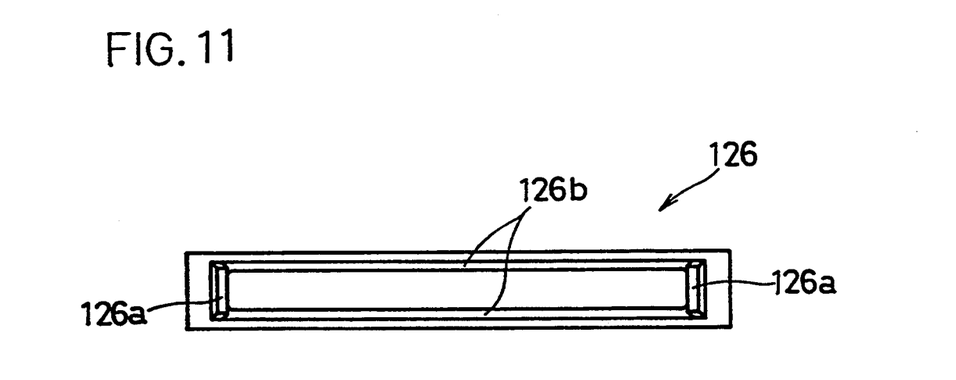
FIG. 11 is a bottom view of a lid member of the case.

The viscous damper 113 is principally composed of a plurality of arcwise cases 124 (refer to FIG. 8) and a box-slider 127 located within each of the cases 124 such that the slider 127 can move circumferentially.

The cases 124 are located in the spaces formed by the container portions 116d and 117d between adjacent tabs 118d of the sub-plate 118. The cases 124 contain the hydraulic fluid commonly used in the torus 2. The case 124 is, as detailed in FIG. 8 to FIG. 11, composed of an arcwise case 125 having U section and opening radially outward, and an arcwise lid member 126 which engages with the opening of the case 125. A side wall of the case 125 is formed with two circular holes 133a keeping a given space between them. The second side plate 117 is formed with a hole 117e (refer to FIG. 5) corresponding to the holes 133a of the case 125. The hole 117e extends circumferentially outward from the holes 133a. Radially inward wall of the case 125 are formed with a slit 125a extending circumferentially. The lid member 126 is provided with projections 126a formed at the circumferentially opposite end to be inserted into-the case 125, and projections 126b extending circumferentially to be inserted into the case 125. Located between the couple member 126 and the cylindrical wall 116c of the first side plate 116 is the cylindrical body 118a of the sub-plate 118.

Figure 12:
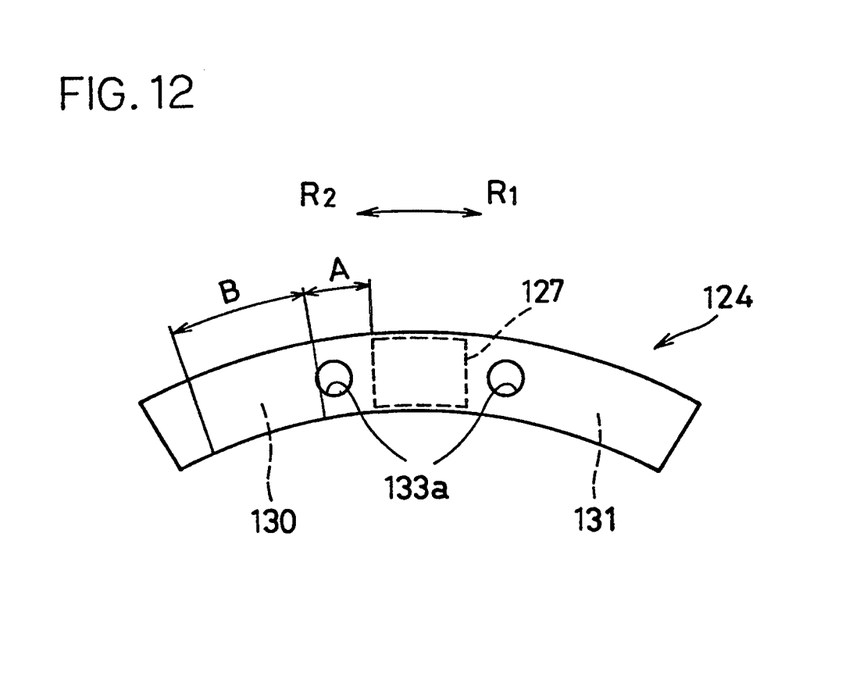
FIG. 12 is a schematic view showing locational relation of the case and a slider.

Radially outer and inner walls of the slider 127 are as arcwise as radially outward and inner walls of the case 124 so that the slider 127 can move circumferentially in the case 124. The slider 127 divides a chamber in the case 124 into chambers 130 and 131 (FIG. 5 and FIG. 12).

The outer periphery of the driven plate 119 is inserted into the slit 125a of the case 125 such that slit 125a is sealed. A plurality of extensions 119a are formed on the outer periphery of the driven plate 119 as shown in FIG. 5 and FIG. 6. The projections 119a are formed at a given spacing circumferentially and are engaged with the sliders 127 in the cases 124. The driven plate 119 is formed with a plurality of holes 119d at the inner periphery and as shown in FIG. 4 a plurality of rivets 9 penetrates the holes 119d so that the driven plate 119 is fixed to the flange 8a of the turbine tab 8.

Formed in the radially middle portion of the driven plate 119 are six windows 119b extending circumferentially, in which four long first torsion springs 122a and two short second torsion springs 122b composing the elastic connection mechanism 114. The first torsion spring 122a has relatively low rigidity and functions in the wide torsional angle range. The second torsion springs 122b are located in the window 119b with spaces circumferentially.

The first side plate 116 and the second side plate 117 are formed with respective raised portions 116c and 117c corresponding to the windows 119b, which portions 116c and 117c are cut and axially raised in order to retain the first torsion springs 122a and the second torsion springs 122b. Radially inward ends of the first side plate 116 and the second side plate 117 are fixed to each other by a plurality of rivets 121. The rivet 121 is inserted into circumferentially extending holes 119c formed in the driven plate so that the first and second side plates 116 and 117 can move circumferentially relative to the driven plate 119 in a given angle range.

Next, operation of the above mentioned embodiment will be explained.

When the engine (next shown) starts, the torque is input into the front cover 4. The impeller 5 rotates with the front cover 4 and the hydraulic fluid flowing from the impeller 5 rotates the turbine 6. The torque of the turbine 6 is transmitted to the transmission main drive shaft (not shown) through the turbine hub 8.

After the transmission main drive shaft reaches a certain rotation speed, oil hydraulics in the fluid chamber of the torus 2 is increased and oil hydraulics between the front cover 4 and piston 111 are decreased so that the piston 111 is urged against the front cover 4. The friction member 111a of the piston 111 is pressed against the friction surface 4b of the front cover 4, and then the torque of the front cover 4 is mechanically transmitted to the turbine hub 8 through the lock-up clutch 3. That is, the torque is transmitted from the front cover 4, to the side plates 116 and 117, the elastic connection mechanism 114, and the driven plate 119, In this order. Since the tabs 118d of the sub-plate 118 support both circumferential ends of the case 124, the torque of the engine side is transmitted to the viscous damper 113.

Torque fluctuations of the engine side is transmitted to the lock-up clutch 3 as torsional vibrations and the first and second side plates (116,117) and the driven plate 119 rotate relative to each other, whereby the viscous damper 113 functions.

Relative movement of the case 124 and the slider 127 and torsional characteristics in the viscous damper 113 will be explained.

Wherein the case 124 rotates relative to the slider 127 in $R_1$ direction from the neutral position in FIG. 12, the divided chamber 131 becomes smaller so that the hydraulic fluid in the divided chamber 130 flows into the divided chamber 131 through the clearance between the slider 127 and the case 124 and flows into the fluid chamber of the torus 2 through the holes 133a and the holes 117e of the second sub-plate 117. During the torsional angle A wherein the hole 133a is not closed by the slider 127, hysteresis torque is small as shown In the torsional characteristics diagram of FIG. 13 because viscous resistance is small. Low rigidity and small hysteresis torque in the torsional angle A range dampens micro-vibrations in the low speed range effectively, which enables the lock-up clutch 3 functions in-the low speed range to decrease fuel consumption.

Figure 13:
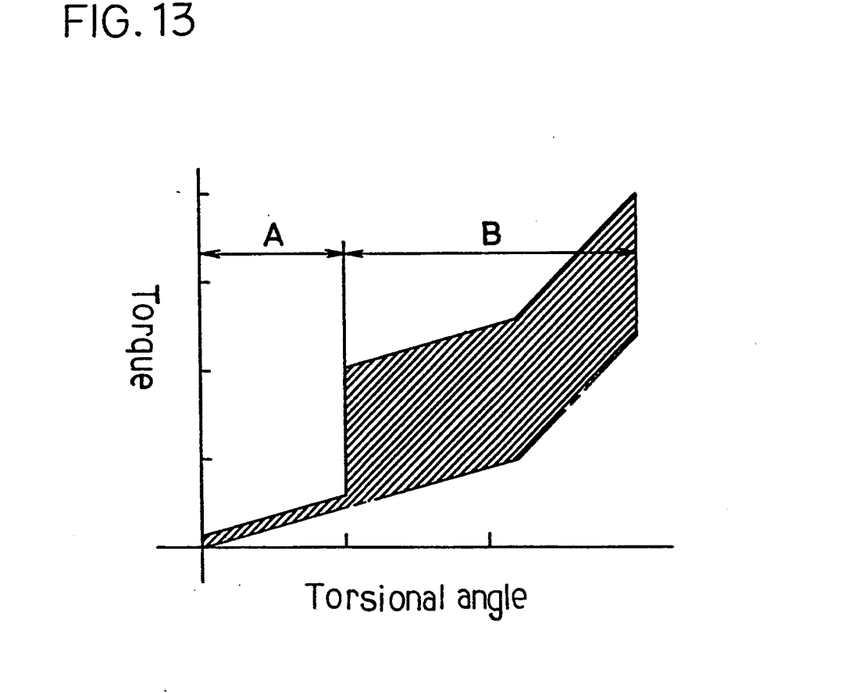
FIG. 13 is a diagram graphing torsional damping characteristics.

In the torsional angle B range after the hole 133a is closed by the slider 127, the hydraulic fluid in the divided chamber 130 flows into the divided chamber 131 through the clearance between the slider 127 and the case 124. Large hysteresis torque is generated in the torsional angle B range because the viscous resistance is large. That is, low rigidity and large hysteresis torque in the torsional angle B range effectively dampens low-frequency vibrations at acceleration or deceleration in the high speed range. High rigidity range occurs during the torsional angle B range because the second torsional springs 122b begin to be compressed.

As explained before, the holes 133a formed in the side wall of the case 124 makes it possible to make the hysteresis torque multiple so that the viscous damper 113 can be effective to different kinds of vibration. Further, alternation of size or location of the holes 33a makes it possible to set optimum torsional characteristics for vehicles to which the torque converter 1 is installed.

The hydraulic fluid pressure generated in the case 124 acts on the case 125 and the lid member 126 composing the case 124. Since the case 125 is formed like U, it has large resistance to axial expansion so that pressure against the side plate 116 and 117 is decreased. Meanwhile, since the case 125 and the cap member 126 are engaged in the radial direction, the case 124 is easier to expand in the radial direction by the hydraulic fluid pressure so that the cylindrical wall 116c of the side plate 116 is likely to be pressed by the lid member 126. In this embodiment, however, the cylindrical portion 118a of the sub-plate 118 is inserted between the lid member 126 and the cylindrical wall 116c and the cylindrical wall 118a is ring-shaped so that the pressure radially outward acts on the sub-plate 118 and does not act on the cylindrical wall 116c of the side plate 116 much.

In this embodiment, the torque from the sub-plate 118 is transmitted to the case 124 through the tabs 118d, and the first side plate 116 and the second side plate 117 are not formed with cut and raised portions for torque transmission. Consequently, strength of the side plate 117 is improved and the side plate 117 is less likely to be deformed.

Since volume of the case 124 is less likely to be changed in the structure of this embodiment, the desired viscous damping characteristics can be always maintained.

Next, resonance frequency during the lock-up clutch functioning will be explained.

Resonance frequency "fn" is shown in the next equation.

$$fn = \{(k_1 + k_2)/I\}^{1/2} 2\pi$$

In this embodiment, torsional rigidity of the elastic connection mechanism 114 correspond to $k_1$, and equivalent moment of inertia of the viscous damper 113 and the elastic connection mechanism 114 corresponds to I. $k_2$ can be ignored because the corresponding part is very small.

The equivalent moment of inertia "I" is shown in the next equation.

$$I=(Ie \times Id)/(Ie+Id)$$

wherein

Ie: a total moment of inertia of the front cover 4, the impeller 5, the piston 111 of the lock-up clutch 3 and the plates 16 to 18 of the torsional vibration damping device 112

Id: a total moment of inertia of the turbine 6 and the driven plate 119 of the lock-up clutch 3.

Generally in the prior art, Ie is larger than Id so that the resonance frequency fn is high. Consequently, when the lock-up clutch 3 is engaged in the low speed range, the resonance frequency enters the lock-up engagement range, which makes it difficult to expand functioning range of the lock-up clutch 3 to the low speed side.

In order to lower the resonance frequency fn, it has to decrease $k_1$ or increase I. There is a limit to decrease $k_1$ because function of the elastic connection mechanism 114 must be maintained. On the hand, in order to increase I, it is necessary to restrict the increase of the total moment of inertia because increased total moment worsens responsive characteristics in acceleration and so on. The condition on which I is maximum and the increase of the total moment of inertia is restricted is that the Ie equals to Id. The inertia ring 41 is provided at Id side in order to make value of Id approach that of Ie because Ie is much larger than Id in the prior art.

As explained before, in this embodiment, since the inertia ring 41 is fixed to the turbine 6, the equivalent moment of inertia at the lock-up engagement becomes larger and the resonance frequency fn shifts to the low speed range, which makes it possible to expand the function range of the lock-up clutch 3 to lower speed range.

Figure 14:
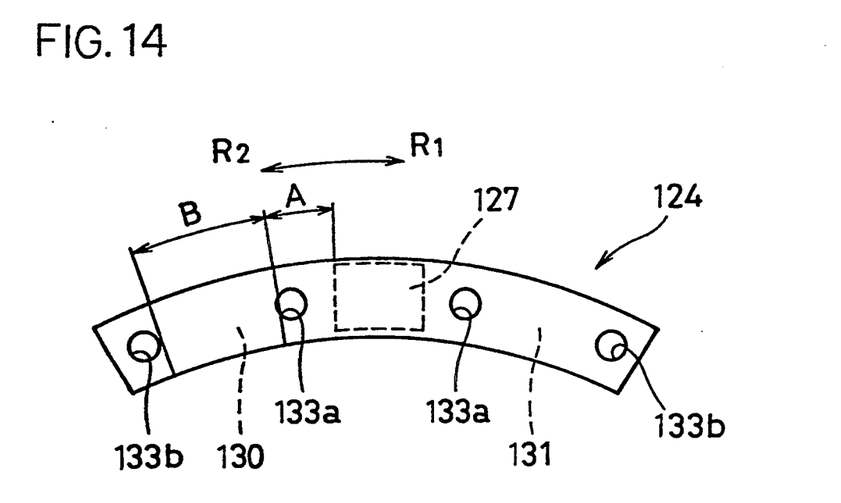
FIG. 14 is a view of another embodiment, corresponding to FIG. 12.
Figure 15:
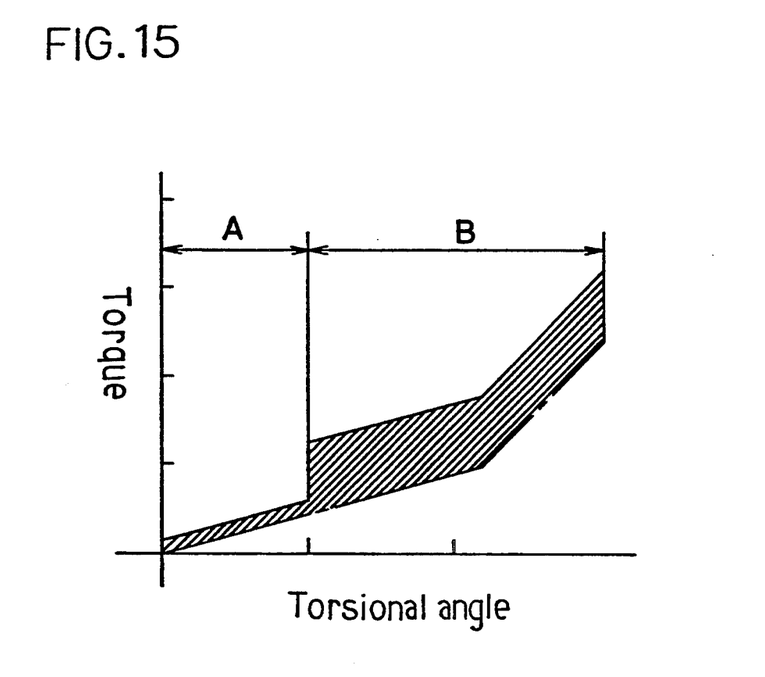
FIG. 15 is a diagram corresponding to FIG. 13.

Other Embodiment (a) Holes formed in the case 124 to control the hysteresis torque is not limited to those of the second embodiment. For example, as shown in FIG. 14, if holes 133*b* are added to both ends of the case 124, the hysteresis torque generated in the torsional angel range B becomes smaller as shown in FIG. 15.

Figure 16:
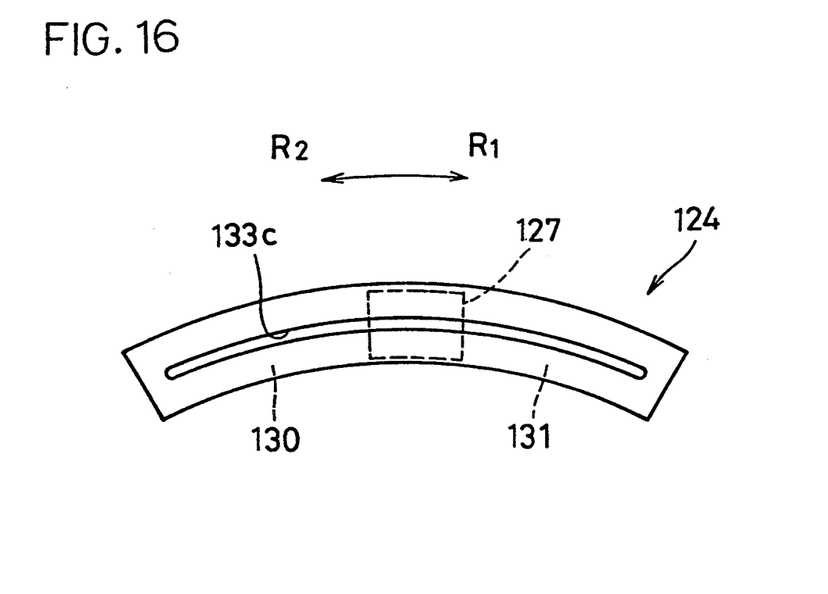
FIG. 16 is a view of yet another embodiment, corresponding to FIG. 12.
Figure 17:
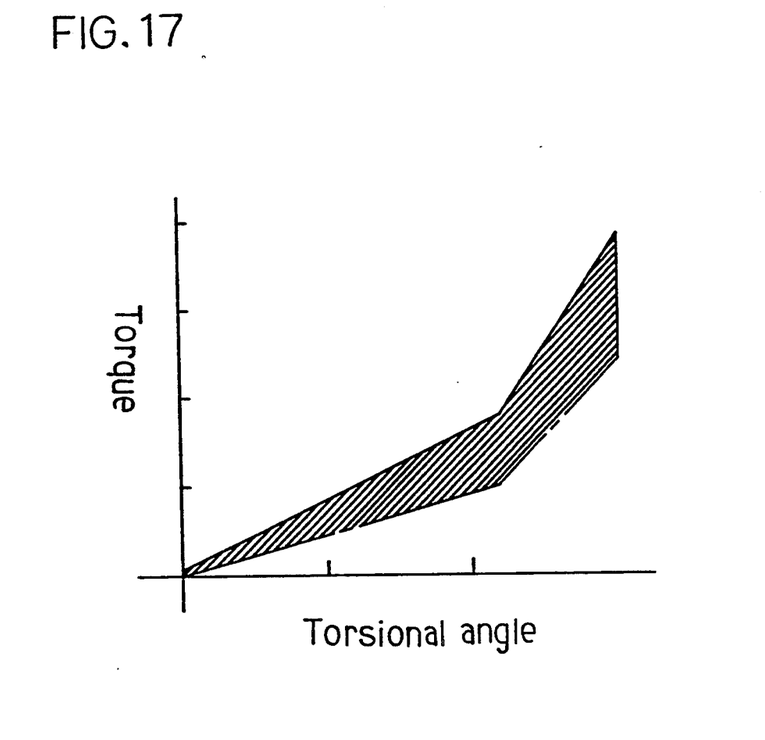
FIG. 17 is a diagram corresponding to FIG. 13.

Formed in the whole side wall of the case 124 as shown in FIG. 16 is a narrow slot 133*c*. As the slot 133*c* corresponding to the divided chamber 130 becomes smaller, the hysteresis torque becomes gradually larger as shown In FIG. 17

The holes or slots formed in the case 124 may be formed in one of both side surfaces, and radially outer and inner walls of the case 124.

(b) The inertia ring 41 may be provided with the driven plate 119 which is an output side member of the lock-up clutch 3. Form and material of inertia ring 41 are not limited.

Various details of the invention may be changed without departing from its spirit nor scope. Furthermore, the foregoing description of the embodiment according to the present invention is provided for the purpose of illustration only, and not for the purpose of limiting the invention as defined by the appended claims and their equivalents.

What is claimed is:

1. A torsional vibration damping device in a power transmission comprising:

a drive plate interconnected with and twistable relative to a driven plate;

a case, made of metal, and connected to said drive plate, said case extending circumferentially and containing fluid; and a slider, made of resin, and connected to said driven plate and disposed to be circumferentially slidable within said case; wherein a clearance is provided between an inside wall of said case and said slider; and coefficient of thermal expansion of said slider is greater than that of said case, said coefficient of thermal expansion of said slider is determined such that when operating temperature of said fluid rises, said slider expands, narrowing said clearance.

2. A torsional vibration damping device according to claim 1, wherein said case is composed of a plurality of arcuate case segments arranged circumferentially; and said slider is composed of a plurality of slider segments corresponding to said plurality of said arcuate case segments.

3. A torsional vibration damping device according to claim 4, wherein said slider segments have radially outer and inner arcuate surfaces formed so as to correspond to radially outer and inner walls of said arcuate case segments.

4. A torsional vibration damping device according to claim 3, wherein said arcuate case segments are fixed to said drive plate, and said slider segments are fixed to said driven plate.

5. A torsional vibration damping device according to claim 4, wherein said arcuate case segments are formed to have a slit extending circumferentially; and said drive plate is an annulus, a peripheral margin of which being inserted into said case through the slit of said arcuate case segments, said peripheral margin having projections onto which said slider segments are fixed.

6. A torsional vibration damping device according to claim 5, wherein said slit is formed in a radially inner side of said arcuate case segments, said driven plate is located radially inward of said arcuate case segments wherein said peripheral margin of said driven plate extends radially outward.

7. A torsional vibration damping device according to claim 6, wherein said drive plate is an annulus integrally supporting said plurality of arcuate case segments.

8. A torsional vibration damping device according to claim 1, wherein said case is made of metal and said slider is made of resin.

9. A lock-up clutch for use in a torque convertor transmitting torque applied to an input-side front cover of the convertor through hydraulic fluid to a turbine connected to an output rotation member, said lock-up clutch comprising:

a locking-up coupler arranged between said front cover and said output rotation member:

a disk-shaped piston disposed between said turbine and said front cover such that said piston is slidable axially to press against said front cover;

an elastic connection mechanism for connecting the piston and said locking-up couplers such that they are twistable relative to each other; and a torsional vibration damping device including a case connectable to one of said locking-up couplers, said case extending circumferentially and containing fluid; and a slider connected to the other of said locking-up couplers, said slider disposed to be circumferentially slidable within said case; wherein a clearance is provided between an inside wall of said case and said slider.

10. A lock-up clutch according to claim 9, wherein said fluid within said case is in common with said fluid in said torque convertor.

11. A lock-up clutch according to claim 9, wherein coefficient of thermal expansion of said slider is greater than that of said case.

12. A lock-up clutch according to claim 11, wherein said coefficient of thermal expansion of said slider is determined such that when operating temperature of said fluid within said case rises, said slider expands, narrowing said clearance.

13. A lock-up clutch according to claim 12, wherein said case is made of metal and said slider is made of resin.

14. A lock-up clutch according to claim 13, wherein said slider is formed to have radially inner and outer arcuate surfaces corresponding to radially inner and outer walls of said case.

15. A lock-up clutch according to claim 11, wherein said case is made of metal and said slider is made of resin.

16. A lock-up clutch according to claim 11, wherein said fluid within said case is in common with said fluid in said torque convertor.

17. A lock-up clutch according to claim 11, wherein said case is composed of a plurality of arcuate case segments arranged circumferentially; and said slider is composed of a plurality of slider segments corresponding to said plurality of said arcuate case segments.

18. A lock-up clutch according to claim 17, wherein said slider segments have radially outer and inner arcuate surfaces formed so as to correspond to radially inner and outer walls of said arcuate case segments.

19. A lock-up clutch according to claim 18, wherein said case is connectable with said front cover, and said slider is connected to said output rotation member;
said lock-up clutch further comprising an input member through which said case is connected to said front cover, and an output member connecting said slider to said output rotation member.

20. A lock-up clutch according to claim 19, wherein said arcuate case segments are formed to have a slit extending circumferentially; and
said output member is an annulus, a peripheral margin of which being inserted into said case through the slit of said arcuate case segments, said peripheral margin having projections onto which said slider segments are fixed.

21. A lock-up clutch according to claim 20, wherein said slit is formed in a radially inner side of said arcuate case segments,
said output member is located radially inward of said arcuate case segments wherein said peripheral margin of said output member extends radially outward.

22. A lock-up clutch according to claim 21, wherein said input member is an annulus circumferentially supporting said plurality of arcuate case segments.

23. A lock-up clutch according to claim 22, wherein said input member and said output member are interconnected by said elastic connection mechanism.

24. A lock-up clutch according to claim 9, wherein said case has a fluid escape.

25. A lock-up clutch according to claim 24, wherein said fluid within said case is in common with said fluid in said torque convertor.

26. A lock-up clutch according to claim 24, wherein said fluid escape includes a first hole formed in said case such that said first hole drains said fluid from said case wherein said input-side front cover and said output rotation member twist relative to each other through a first torsional angle range and such that said first hole does not drain said fluid through a second torsional angle range thereof greater than said first torsional angle range.

27. A lock-up clutch according to claim 26, wherein said fluid escape further includes a second hole for draining fluid through said second torsional angle of the twisting of said input-side front cover and said output rotation member relative to each other.

28. A lock-up clutch according to claim 24, wherein said fluid escape is a slit extending circumferentially.

29. A lock-up clutch according to claim 24, wherein said case is composed of a plurality of arcuate case segments, each of which being composed of an arcuate first segment part and an arched second segment part for radially outward engagement with said first segment part such that said first segment part and said segment part member cannot move axially relative to each other.

30. A lock-up clutch according to claim 29, further comprising:
a pair of disk-shaped, peripherally Joined lateral plates enclosing axial end surfaces of said arcuate case segments and enclosing a radially outward surface of said arcuate case segments; and
an annular retaining plate, interposed between said lateral plates and said radially outward surface of said second segment parts, therein being rotatable in conjunction with said piston locking-up coupler, said annular retaining plate having radially spaced retainers for retaining either of circumferentially opposed ends of said arcuate cases.

31. A lock-up clutch according to claim 30, wherein said first segment part is U-shaped in cross-section; and said second segment part is a lid member for engagement with a corresponding radially outward opening of the U-shaped first segment part.

32. A lock-up clutch according to claim 31, wherein said opening of said U-shaped first segment part opens radially outward such that said lid member is received radially outward engagement with said opening.

33. A lock-up clutch according to claim 32, wherein said lateral plates are formed to have a fluid passage at a location corresponding to said fluid escape of said arcuate case.

34. A lock-up clutch according to claim 31, wherein said lateral plates are formed to have a fluid passage at a location corresponding to said fluid escape of said arcuate case.

35. A lock-up clutch according to claim 29, wherein said first segment part is U-shaped in cross-section; and said second segment part is a lid member for engagement with a corresponding opening of the U-shaped first segment part.

36. A lock-up clutch according to claim 35, wherein said opening of said U-shaped first segment part opens radially outward such that said lid member is received radially outward engagement with said opening.

37. A lock-up clutch according to claim 24, wherein said case is composed of a plurality of arcuate case segments arranged circumferentially; said lock-up clutch further comprising:
   a pair of disk-shaped, peripherally joined lateral plates enclosing axial end surfaces and a radially outward surface of said arcuate case segments; and
   an annular retaining plate located radially between said arcuate case segments and said lateral plates, wherein it is not rotatable relative to said piston locking-up coupler, said annular retaining plate having radially spaced retainers for retaining either of circumferentially opposed ends of said arcuate case segments.

38. A lock-up clutch according to claim 37, wherein said lateral plates are formed to have a fluid passage at a location corresponding to said fluid escape of said arcuate case.

39. A lock-up clutch according to claim 38, wherein said pair of lateral plates and said annular retaining plate are fixed to each other and are engaged with said piston locking-up coupler, wherein the piston can move axially, but cannot rotate relative to said lateral plates and said annular plate.

40. A lock-up clutch according to claim 39, wherein said pair of lateral plates and said rotation output locking-up coupler are interconnected by said elastic connection mechanism.

* * * * *